United States Patent
Sarioglu et al.

(10) Patent No.: US 11,097,273 B2
(45) Date of Patent: Aug. 24, 2021

(54) SYSTEMS AND METHODS FOR HIGH-THROUGHPUT CELL SCREENING

(71) Applicant: Georgia Tech Research Corporation, Atlanta, GA (US)

(72) Inventors: Ali Fatih Sarioglu, Atlanta, GA (US); Chia-Heng Chu, Atlanta, GA (US); Ruxiu Liu, Atlanta, GA (US); Tevhide Ozkaya-Ahmadov, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 177 days.

(21) Appl. No.: 16/313,191

(22) PCT Filed: Jun. 28, 2017

(86) PCT No.: PCT/US2017/039756
§ 371 (c)(1),
(2) Date: Dec. 26, 2018

(87) PCT Pub. No.: WO2018/005647
PCT Pub. Date: Jan. 4, 2018

(65) Prior Publication Data
US 2019/0160464 A1     May 30, 2019

Related U.S. Application Data

(60) Provisional application No. 62/355,745, filed on Jun. 28, 2016.

(51) Int. Cl.
*B01L 3/00*     (2006.01)
*G01N 1/34*     (2006.01)
(Continued)

(52) U.S. Cl.
CPC ... *B01L 3/502761* (2013.01); *B01L 3/502707* (2013.01); *B01L 3/502746* (2013.01);
(Continued)

(58) Field of Classification Search
None
See application file for complete search history.

(56) References Cited

U.S. PATENT DOCUMENTS

| 7,775,496 | B2 * | 8/2010 | Johnson | E04C 3/005 248/405 |
| 7,790,124 | B2 | 9/2010 | Matteo | |

(Continued)

FOREIGN PATENT DOCUMENTS

| WO | 2011015359 | 2/2011 |
| WO | 2013049860 | 4/2013 |
| WO | 2015177603 | 5/2015 |

OTHER PUBLICATIONS

Blin, A. et al. Microfluidic model of the plateletgenerating organ: beyond bone marrow biomimetics, Scientific Reports, 6:21700 (Year: 2016).*

(Continued)

*Primary Examiner* — Xiaoyun R Xu
(74) *Attorney, Agent, or Firm* — Troutman Pepper Hamilton Sanders LLP; Ryan Schneider; Dustin Weeks

(57) ABSTRACT

The disclosed technology includes devices and methods for detecting rare cells in whole blood samples using a microfluidic device. Such devices include a housing with a microfluidic chamber having first and second microfluidic layers, each microfluidic layer having an array of microscale structure. Other disclosed devices also include a housing including a chemically functionalized hydrogel matrix and a pump connected to the housing. Disclosed methods include constructing, with an additive manufacturing device, a microfluidic device having a microfluidic chamber, removing, by a thermal release process, at least some of the sacrificial support material deposited by the additive manufacturing device, and chemically functionalizing at least a portion of the microfluidic chamber. Other disclosed methods include (Continued)

chemically functionalizing a hydrogel matrix and connecting the chemically functionalized hydrogel matrix to a pump.

24 Claims, 11 Drawing Sheets

(51) Int. Cl.
| | |
|---|---|
| G01N 1/40 | (2006.01) |
| B33Y 10/00 | (2015.01) |
| B33Y 40/00 | (2020.01) |
| B33Y 80/00 | (2015.01) |
| B29C 33/38 | (2006.01) |
| B29C 33/40 | (2006.01) |
| B29C 39/02 | (2006.01) |
| B29C 39/36 | (2006.01) |
| B29C 39/38 | (2006.01) |
| B33Y 70/00 | (2020.01) |
| B29K 83/00 | (2006.01) |
| B29L 31/00 | (2006.01) |

(52) U.S. Cl.
CPC .......... *B29C 33/3842* (2013.01); *B29C 33/40* (2013.01); *B29C 39/02* (2013.01); *B29C 39/36* (2013.01); *B29C 39/38* (2013.01); *B33Y 10/00* (2014.12); *B33Y 40/00* (2014.12); *B33Y 80/00* (2014.12); *G01N 1/34* (2013.01); *G01N 1/4077* (2013.01); *B01L 2200/0647* (2013.01); *B01L 2200/0652* (2013.01); *B01L 2300/0681* (2013.01); *B01L 2300/0809* (2013.01); *B01L 2300/0887* (2013.01); *B01L 2300/163* (2013.01); *B01L 2400/086* (2013.01); *B29K 2083/00* (2013.01); *B29L 2031/752* (2013.01); *B33Y 70/00* (2014.12); *G01N 2001/4088* (2013.01)

(56) References Cited

U.S. PATENT DOCUMENTS

| | | |
|---|---|---|
| 2010/0203521 A1 | 8/2010 | Klapperich et al. |
| 2011/0262489 A1 | 10/2011 | Zhao |
| 2012/0077246 A1 | 3/2012 | Hong et al. |
| 2014/0255270 A1 | 9/2014 | Satsanarukkit et al. |

OTHER PUBLICATIONS

Castro, J.A., et al. Hemi-Functionalized Silicon Filters for Simultaneous Capturing and Typing of Circulating Tumor Cells, 18th International Conference on Miniaturized Systems for Chemistry and Life Sciences Oct. 26-30, 2014, San Antonio, Texas, USA (Year: 2014).*

Ehe, C.etal. Glycopolymer-Functionalized Cryogels as Catch and Release Devices for the Pre-Enrichment of Pathogens, ACS Macro Letters, 5, 326-331 (Year: 2016).*

International Search Report and Written Opinion from Application No. PCT/US2017/039756 dated Sep. 14, 2017 (19 pages).

\* cited by examiner

SYSTEMS AND METHODS FOR HIGH-THROUGHPUT CELL SCREENING

CROSS-REFERENCE TO RELATED APPLICATIONS

This application claims priority to, and the benefit under 35 U.S.C. § 119(e), of U.S. Provisional Patent Application No. 62/355,745, filed 28 Jun. 2016 and entitled "Massively Parallel Microfluidic Devices for High-Throughput Cell Screening," the entire contents and substance of which are hereby incorporated by reference as if fully set forth below.

BACKGROUND

Metastasis is responsible for more than 90% of cancer-related deaths. Cancer metastasizes through the bloodstream as migratory circulating tumor cells (CTCs) shed from a primary tumor disseminate to distant organs and proliferate in a new microenvironment. Prognostic value of CTCs identified in the blood samples of cancer patients has been established in many cancers, such as breast, colon and prostate cancers. In some cancers such as lung cancer, CTCs may be used as predictive markers for targeted drug therapy. In addition to metastatic cancers, the presence of CTCs may be associated with poor disease progression in cancers such as early-stage non-metastatic breast cancer. As such, the isolation and analysis of rare CTCs may hold great promise for providing insight into blood-borne metastasis, as well as noninvasive monitoring of patient response to cancer treatments and therapeutic interventions.

Reliable isolation of CTCs from clinically relevant volumes of blood, however, remains a technological challenge. Many existing technologies developed to detect CTCs in blood samples rely on enrichment of CTCs based on their biochemical or biophysical differences from hematopoietic cells. For example, bulk immunomagnetic enrichment techniques, including the FDA-approved CellSearch system, use antibody conjugated magnetic beads to target tumor cells and subsequently isolate them in a magnetic field. Filters have also been used to isolate tumor cells that are larger than blood cells, but the efficacy and/or efficiency of existing filtering methods are limited due to size overlap between leukocytes and tumor cells.

Some existing techniques employ microfluidic technologies for CTC isolation. While the microfluidic processing of clinical samples may offer better sensitivity and cell viability than other existing techniques, processing throughput is inherently limited. Microfluidic processing of clinically relevant volumes of blood samples for CTC isolation can take many hours to complete and generally constitute a primary bottleneck of the CTC detection process. This limitation is likely a prevalent factor that has prevented any widespread adoption of the technology that may have otherwise occurred.

Besides the technological challenges associated with the scarcity of CTCs in the patient blood, reliable isolation of CTCs is further complicated by the intra- and inter-patient heterogeneity among tumor cells. Many, if not all, existing CTC detection technologies target epithelial cell adhesion molecule (EpCAM) to identify CTCs. Although this strategy may be effective at targeting EpCAM-positive tumor cells, it may also lead to a biased selection of CTCs and may fail to detect tumor cells of non-epithelial cancers (e.g., melanoma), as well as CTCs with down-regulated EpCAM expression due to the Epithelial-to-Mesenchymal Transition (EMT) process. To address CTC heterogeneity and create a CTC enrichment platform applicable to some cancer types, it may be possible to negatively enrich blood samples by depleting leukocytes with known cluster of differentiation (CD) markers. However, bulk immunomagnetic depletion of leukocytes typically results in low sensitivity due to the multiple batch pre-processing steps that are typically required. Microfluidic devices may be used for leukocyte depletion, but such devices generally require magnetic pre-labeling of leukocytes. Additionally, microfluidic devices are limited to very slow processing rates (e.g., approximately 8 mL/hr), and these devices typically expose the cells to high shear forces, which may decrease cell viability. Meanwhile, existing label-free microfluidic devices for leukocyte depletion may not be practical for processing clinical samples due to limited processing rates and physical limitations of typical antibody-functionalized microfluidic devices that may cause the devices to quickly become saturated by captured leukocytes, effectively clogging the devices and preventing continued use of the devices.

Thus, existing technologies are not able to effectively detect CTCs in whole blood or efficiently detect CTCs at a high processing rate.

SUMMARY

The above needs and others may be addressed by certain implementations of the disclosed technology.

According to an example implementation, a device can comprise a housing including an inlet opening and outlet opening and a microfluidic chamber in fluid communication with the inlet opening and the outlet opening. In some embodiments, the microfluidic chamber can include a first microfluidic layer having a first array of microscale structures and a second microfluidic layer having a second array of microscale structures.

In some embodiments, the first microfluidic layer can be positioned on a first plane and the second microfluidic layer can be positioned on a second plane that is different from the first plane.

In some embodiments, the first plane can be parallel to the second plane.

In some embodiments, at least some of the microscale structures of the first array of microscale structures can be positioned in an aligned arrangement such that the at least some microscale structures of the first array of microscale structures are aligned with adjacent microscale structures of the first array of microscale structures.

In some embodiments, at least some of the microscale structures of the first array of microscale structures can be positioned in an offset arrangement such that the at least some microscale structures of the first array of microscale structures are not aligned with at least one adjacent microscale structure of the first array of microscale structures.

In some embodiments, at least some of the microscale structures of the first array of microscale structures can have a cross-section that is approximately a circle.

In some embodiments, at least some of the microscale structures of the first array of microscale structures can have a cross-section that is approximately an oval.

In some embodiments, at least some of the microscale structures of the first array of microscale structures have a cross-section that is approximately a triangle.

In some embodiments, at least some of the microscale structures of the first array of microscale structures can have a cross-section that is approximately a square.

In some embodiments, at least some of the microscale structures of the first array of microscale structures can have a cross-section that is approximately a rectangle.

In some embodiments, at least some of the microscale structures of the first array of microscale structures can have a cross-section that is approximately a rhombus.

In some embodiments, the first microfluidic layer can comprise a first aperture and the second microfluidic layer can comprise a second aperture that is concentric with the first aperture, and the device can comprise a column that can be positioned within the first aperture and the second aperture and can extend from a bottom surface of the microfluidic chamber to a top surface of the microfluidic chamber.

In some embodiments, the column can be isolated from contact with the first microfluidic layer and the second microfluidic layer.

In some embodiments, the microfluidic chamber can comprise channels having a height of approximately 100 µm.

In some embodiments, at least some of the microscale structures of the first array of microscale structures can have a diameter in the range of approximately 100 µm to approximately 250 µm.

In some embodiments, at least some of the microscale structures of the first array of microscale structures can be positioned at a period in the range of approximately 100 µm to approximately 500 µm.

In some embodiments, the microscale structures of the first array of microscale structures can be herringbone structures.

In some embodiments, the microscale structures of the first array of microscale structures can have a width in the range of approximately 150 µm to approximately 245 µm.

In some embodiments, the microscale structures of the first array of microscale structures can be positioned at a period in the range of approximately 400 µm to approximately 600 µm.

In some embodiments, at least one of the first microfluidic layer and the second microfluidic layer can be removably attachable to the housing.

In some embodiments, at least one of the first and second microfluidic layers can be chemically functionalized with an antibody.

In some embodiments, the first microfluidic layer can be chemically functionalized with a first antibody and the second microfluidic layer can be chemically functionalized with a second antibody that is different from the first antibody.

In some embodiments, the device further comprises a filter.

In some embodiments, the filter and at least one of the first and second microfluidic layers can be chemically functionalized with an antibody.

According to an example implementation, a method can comprise constructing, using an additive manufacturing device, a microfluidic device. The microfluidic device can comprise a housing including an inlet opening and outlet opening and a microfluidic chamber in fluid communication with the inlet opening and the outlet opening. The microfluidic chamber can include a first microfluidic layer having a first array of microscale structures and a second microfluidic layer having a second array of microscale structures. The method can further comprise removing, by a thermal release process, at least some sacrificial support material deposited by the additive manufacturing device and chemically functionalizing at least a portion of the microfluidic chamber.

In some embodiments, the thermal release process can include placing the microfluidic device in an oven at a predetermined temperature for a predetermined amount time, placing the microfluidic device in a hot liquid bath, and flushing a hot liquid through the microfluidic chamber.

In some embodiments, the thermal release process can further include providing a negative pressure, from a negative pressure source, to the microfluidic chamber.

In some embodiments, the hot liquid can be water.

In some embodiments, the hot liquid can be mineral oil, acetone, or isopropanol.

In some embodiments, the thermal release process can include placing the microfluidic device in an oven at a predetermined temperature for a predetermined amount time, placing the microfluidic device in a hot liquid bath, conducting a first flush of a hot liquid through the microfluidic chamber, and conducting a second flush of a hot dissolvent through the microfluidic chamber.

In some embodiments, the thermal release process can further include providing a negative pressure, from a negative pressure source, to the microfluidic chamber.

In some embodiments, a method can further comprise flushing the microfluidic chamber with uncured polydimethylsiloxane (PDMS) and applying an airflow to the microfluidic chamber.

According to an example implementation, a method can comprise creating, with an additive manufacturing device, a negative mold of a three-dimensional channel that is composed of a material having a lower melting point than polydimethylsiloxane (PDMS) and suspending the negative mold in a container. The method can also comprise providing PDMS into the container, allowing the PDMS to cure, and removing, by a thermal release process, the negative mold.

According to an example implementation, a device can comprise a housing including a chemically functionalized hydrogel matrix and a pump connected to the housing.

In some embodiments, the pump can also be connected to a filter.

In some embodiments, the filter can be chemically functionalized.

In some embodiments, the chemically functionalized hydrogel can be a chemically functionalized cryogel.

According to an example implementation, a method can comprise chemically functionalizing a hydrogel matrix and connecting the chemically functionalized hydrogel matrix to a pump.

In some embodiments, the device can further comprise connecting the pump to a filter.

In some embodiments, the filter can be chemically functionalized.

In some embodiments, the hydrogel matrix can be a cryogel matrix.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1:
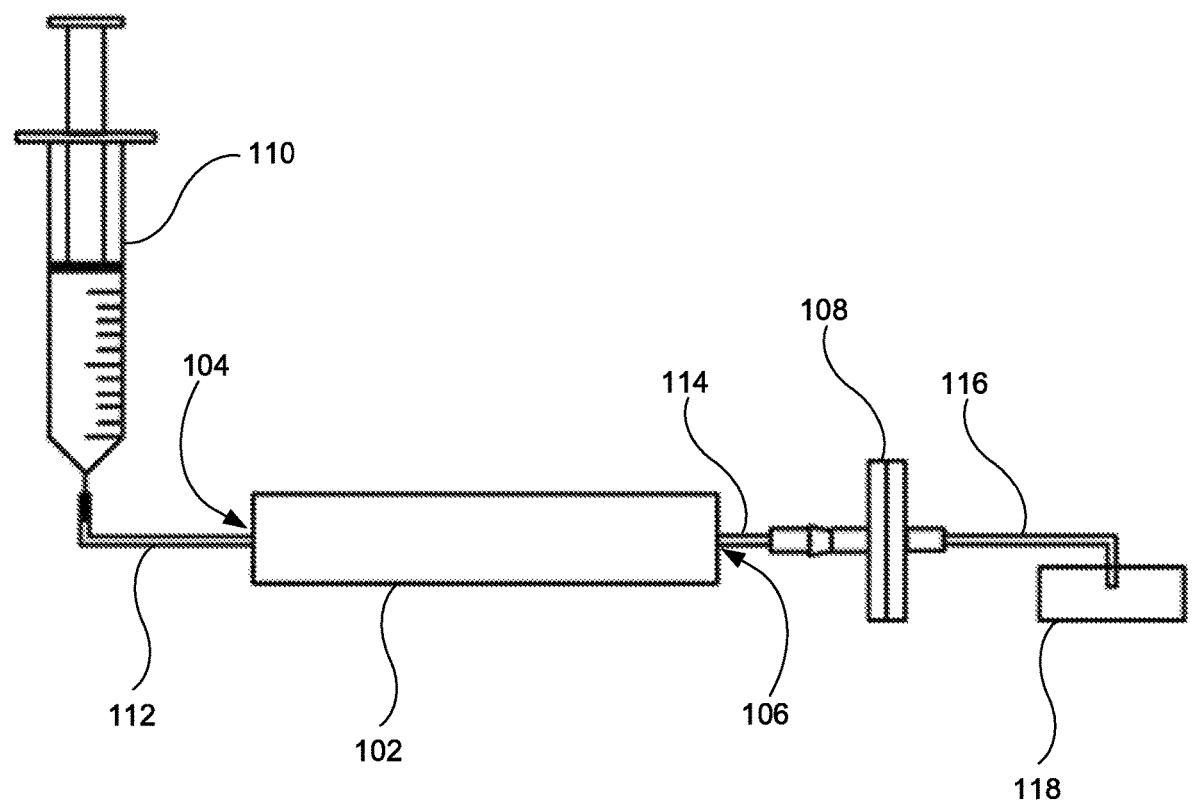
FIG. 1 depicts a schematic view of a cell-screening system, in accordance with an example embodiment of the presently disclosed technology.

Some implementations of the disclosed technology will be described more fully hereinafter with reference to the accompanying drawings. This disclosed technology may, however, be embodied in many different forms and should not be construed as limited to the implementations set forth therein.

In the following description, numerous specific details are set forth. However, it is to be understood that implementations of the disclosed technology may be practiced without these specific details. In other instances, well-known methods, structures, and techniques have not been shown in detail in order not to obscure an understanding of this description. References to "implementation", "example implementation", "embodiment", and/or "example embodiment" of the disclosed technology so described may include a particular feature, structure, or characteristic, but not every implementation necessarily includes the particular feature, structure, or characteristic. Further, repeated use of the phrase "in one implementation" or "in one embodiment" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to, and are not intended to imply that the objects so described should be in a given sequence, either temporally, spatially, in ranking, or in any other manner.

Also, in describing the exemplary embodiments, terminology will be resorted to for the sake of clarity. It is intended that each term contemplates its broadest meaning as understood by those skilled in the art and includes all technical equivalents that operate in a similar manner to accomplish a similar purpose.

To facilitate an understanding of the principles and features of the present disclosure, example embodiments are explained hereinafter with reference to their implementation in an illustrative embodiment. Such illustrative embodiments are not, however, intended to be limiting.

The materials described hereinafter as making up the various elements of the embodiments of the present disclosure are intended to be illustrative and not restrictive. Many suitable materials that would perform the same or a similar function as the materials described herein are intended to be embraced within the scope of the example embodiments. Such other materials not described herein can include, but are not limited to, materials that are developed after the time of the development of the disclosed technology, for example.

Generally speaking, tumor cells and/or rare blood cells are similar in size to, but slightly larger than, white blood cells. White bloods cells are typically larger than red blood cells, which are typically larger than platelets. These cells constitute a large percentage of the cells that typically constitute a whole blood sample. Depending on the pore size of the filter used, existing technologies tend to clog if used to filter whole blood samples for CTCs and/or rare cells. This is due to the similar size and extremely large number of white blood cells in whole blood samples. By depleting white blood cells from a whole blood sample prior to the whole blood sample reaching a filter, a filter sized to collect tumor cells and/or rare blood cells can be used, while allowing red blood cells and platelets to pass through the filter and into a waste container, and without clogging the filter with white blood cells.

Embodiments of the disclosed technology include a transformative blood-based biopsy technology that may address the shortcomings of existing CTC isolation methods and may provide sensitive, label-free isolation of viable CTCs from blood samples.

Referring to FIG. 1, a microfluidic device 102 can be configured to accept whole blood from a syringe 110. The whole blood may exit the syringe 110 and may travel through an inlet tube 112 and into an inlet 104 of the microfluidic device 102. The microfluidic device 102 may be configured to deplete white blood cells, for example, from the whole blood and may release an enriched blood product from an outlet 106 of the microfluidic device 102. In some embodiments, an outlet tube 114 can be connected to the outlet 106. In certain embodiments, the outlet tube 114 can also connect to a filter 108. In some embodiments, the filter 108 may be attached directly to the microfluidic device 102, and in some embodiments, the filter 108 may be integral with the microfluidic device 102.

The filter 108 may be selected according to a desired pore size, which may be influenced by the size contrast between target particles and residual particles in the blood, as well as filtration pressure. For example, the filter 108 may be selected such that, following depletion of white blood cells by the microfluidic device 102, the filter 108 may allow all red blood cells and platelets in the blood to pass through the filter and through a waste tube 116 into the waste container 118. This example filter 108 may restrain any residual white blood cells that were not depleted by the microfluidic device 102 and any CTCs or other rare cells.

Referring to FIGS. 2A-2D, in some embodiments, the microfluidic device 102 may have an internal matrix 202 that may include multiple, parallel, simultaneously running channels 204. Some embodiments may have upwards of 100, 200, 300, or more channels 204. To increase the likelihood that all white blood cells come into contact with the internal matrix 202, according to some embodiments, the surface area of the channels 204 in the internal matrix 202 may be 10 times the surface area necessary to capture all white blood cells in the whole blood sample. In certain embodiments, the surface area of the internal matrix 202 is upwards of 100 times to 200 times the necessary surface area to capture all white blood cells. The internal matrix 202 may be in fluid connection with an inlet 104 and an outlet 106 of the microfluidic device 102. In some embodiments, the microfluidic device 102 may be monolithic; in some embodiments, the microfluidic device 102 may comprise two or more parts. In some embodiments, the microfluidic layers 206 may be manufactured individually, such as the embodiments of the microfluidic layer shown in FIG. 2C. In some embodiments, the monolithic microfluidic device 102 may occupy the typical area of a single-channel microfluidic chip fabricated using soft lithography or hot embossing. The microfluidic device 102 may include numerous channels 204 configured to simultaneously facilitate the passage of blood.

Figure 2A:
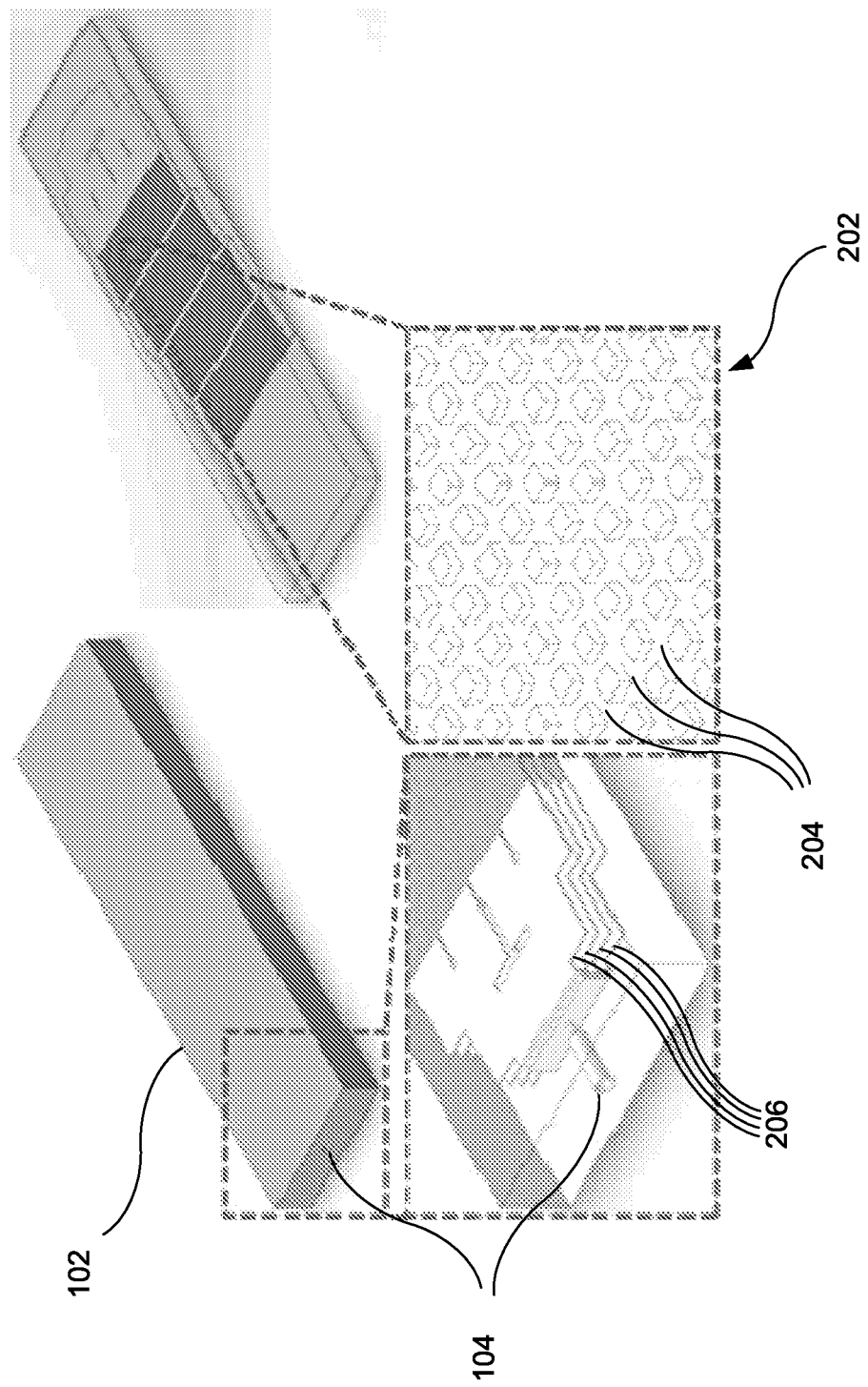
FIG. 2A depicts a microfluidic device, in accordance with an example embodiment of the presently disclosed technology.
Figure 2B:
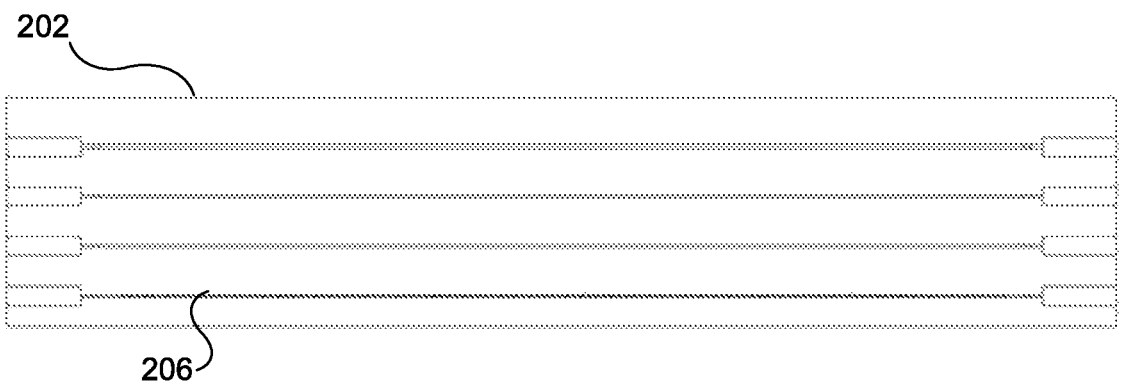
FIG. 2B depicts a side view of a microfluidic device, in accordance with an example embodiment of the presently disclosed technology.
Figure 2C:
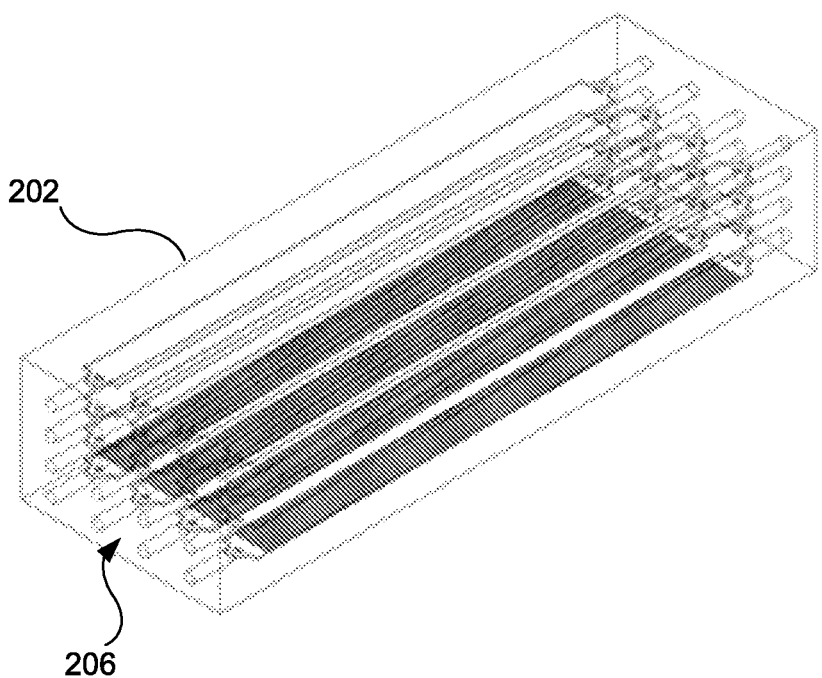
FIG. 2C depicts a perspective view of a microfluidic device with some microfluidic layers shown as transparent, in accordance with an example embodiment of the presently disclosed technology.
Figure 2D:
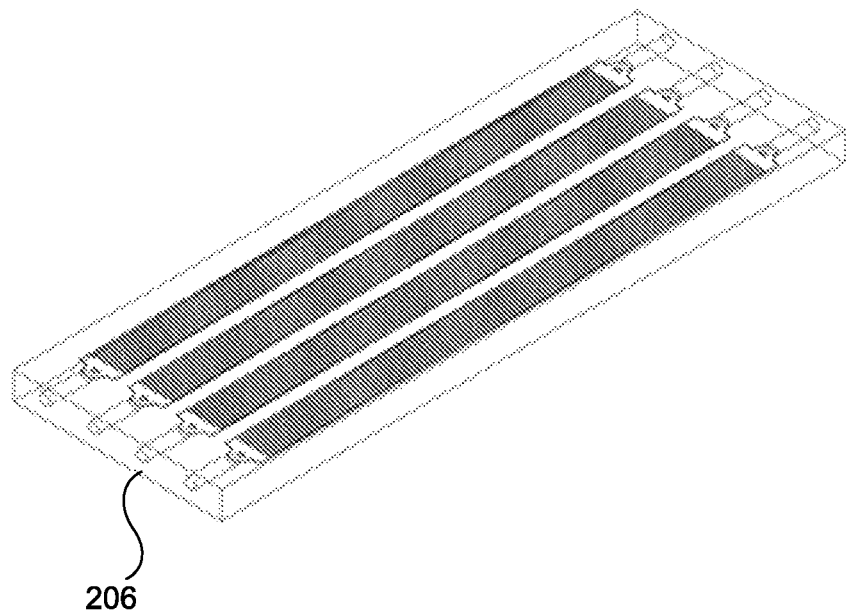
FIG. 2D depicts a microfluidic layer, in accordance with an example embodiment of the presently disclosed technology.

In some embodiments, the microfluidic device 102 and/or the internal matrix 202 may be constructed using additive manufacturing techniques. In some embodiments and as shown in FIGS. 2A-2B, the internal matrix 202 may include multiple microfluidic layers 206 stacked atop one another, which may increase the overall throughput capability of the microfluidic device 102. Some embodiments may include two, three, four, five, ten, fifteen, or more microfluidic layers 206, although any suitable number of microfluidic layers 206 is herein contemplated. For example, the embodiment depicted in FIG. 2A is shown as having four microfluidic layers 206. In the application of CTC isolation, for example, this configuration may be capable of processing several hundred milliliters of blood per hour while maintaining a rate of cell flow sufficient to capture CTCs using antibodies, as described below.

Some embodiments may be dimensioned similarly to that of a typical glass slide. For example, some embodiments may be approximately one inch wide and three inches long. The height of the microfluidic device may depend on the number of microfluidic layers included in the microfluidic device. For example, a microfluidic device including four microfluidic layers may have a height of approximately one-eighth of an inch. Other embodiments may be much larger. The size of the microfluidic device is dependent on factors including the desired speed of the isolation process and the desired volumetric throughput of blood.

Figure 3:
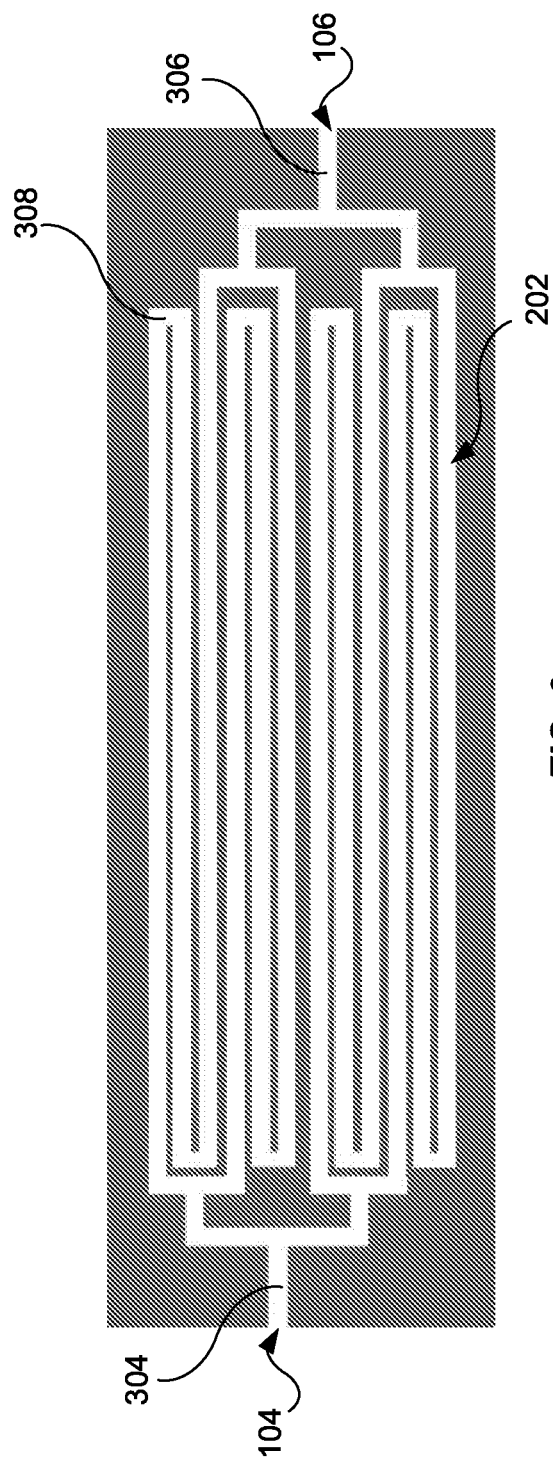
FIG. 3 depicts a side schematic view of a microfluidic device having serpentine channels, in accordance with an example embodiment of the presently disclosed technology.

Referring to FIG. 3, some embodiments of the microfluidic device 102 may include an entrance channel 304 in fluid communication with the inlet 104 and the internal matrix 202; some embodiments may include an exit channel 306 in fluid communication with the internal matrix 202 and the outlet 106. In some embodiments, the entrance channel 304 may split into two or more entrance channels, and in some embodiments, the exit channel 306 may similarly split into two or more exit channels. The entrance channels 304 and/or exit channel 306 may split in the Z-direction (i.e., the direction of the height of the microfluidic device 102), in the Y-direction (i.e., the direction of the width of the microfluidic device 102), in the X-direction (i.e., in the direction of the length of the microfluidic device 102), or in any combination of these directions. Such splits in the entrance channel 304 and/or exit channel 306 may improve the volumetric utilization of the internal matrix 202 by eliminating "dead zones" where fluid would not otherwise flow.

Embodiments of the internal matrix 202 may include many different geometries and configurations. For example, channels of the internal matrix 202 may include one or more serpentine channels 308, as shown in FIG. 3. Certain embodiments may include a plurality of microfluidic layers, and some of all of the microfluidic layers may include channels following a serpentine path.

In some embodiments, the internal matrix 202 of the microfluidic device 102 may be chemically functionalized. In certain embodiments, the internal matrix 202 may be chemically functionalized with an antibody. Functionalization refers to modification of the surface chemistry of at least portions of the internal matrix 202 of the microfluidic device 102 such that the surface chemistry of the internal matrix 202 may interact with and capture targeted cells such that the targeted cells may be depleted from the blood sample. For example, some embodiments may be functionalized to target white blood cells such that white blood cells may be depleted the from the blood sample. In certain embodiments, other cells may be targeted, as desired. The concept of functionalization and methods with which to chemically functionalize a microfluidic device 102 are discussed in more detail below.

Figure 4A:
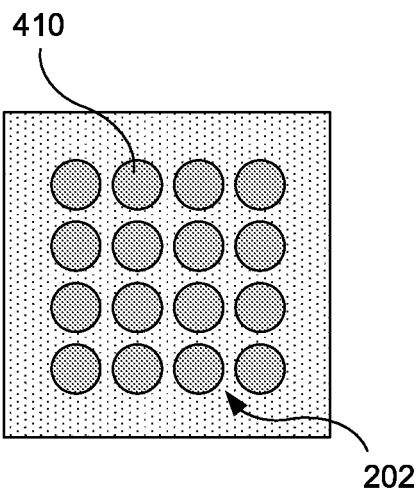
FIG. 4A depicts a top view of an arrangement of columns within a microfluidic device, in accordance with an example embodiment of the presently disclosed technology.
Figure 4B:
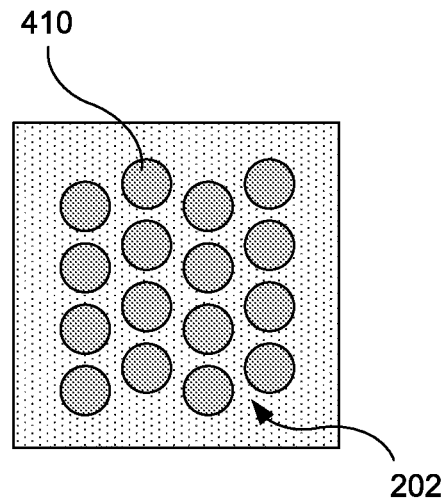
FIG. 4B depicts a top view of an arrangement of columns within a microfluidic device, in accordance with an example embodiment of the presently disclosed technology.
Figure 5A:
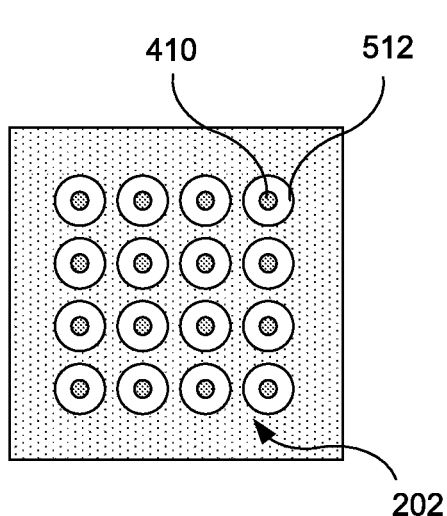
FIG. 5A depicts a top view of an arrangement of columns and apertures within a microfluidic device, in accordance with an example embodiment of the presently disclosed technology.
Figure 5B:
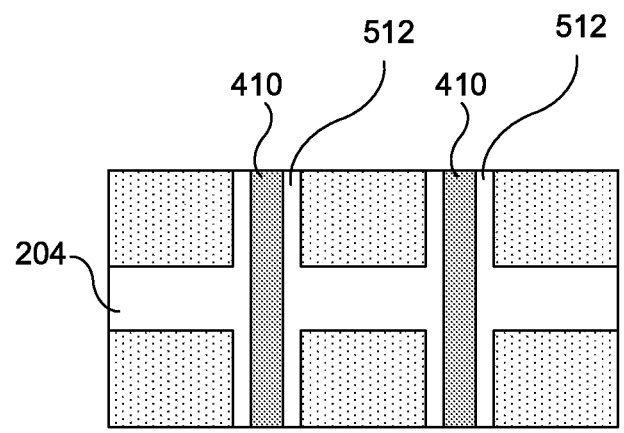
FIG. 5B depicts a side view of an arrangement of columns and apertures within a microfluidic device, in accordance with an example embodiment of the presently disclosed technology.

Some embodiments may include an internal matrix 202 comprising a plurality of columns 410, which may provide rigidity for the channels 204 while increasing the available surface area inside the channels 204. The columns 410 may be positioned in multiple different arrangements. Some embodiments may include columns 410 that are positioned in an aligned arrangement, such as the arrangement shown in FIG. 4A, and some embodiments may include columns 410 that are positioned in an offset arrangement, such as the arrangement shown in FIG. 4B. In some embodiments, the cross-section of the columns may be of any useful shape, such as a circle, oval, triangle, square, rectangle, rhombus, or the like. As shown in FIGS. 5A and 5B, some embodiments may include a "fireman pole" formation, wherein each stacked microfluidic layer 206 has a concentric hole 512 and a column 410 extends through the concentric holes 512 from the bottom of the microfluidic device 102 to the top of the microfluidic device 102. This may increase the amount of surface area within the internal matrix 202 that has minimal surface roughness. When using additive manufacturing devices, boundaries between the print material and the sacrificial support material may cause a small amount of surface roughness, which may slightly inhibit the capture capability of the chemically functionalized microfluidic device 102. By including columns 410 that do not come into contact with the sacrificial support material, the resultant surface roughness of those columns 410 may be minimized.

Figure 6:
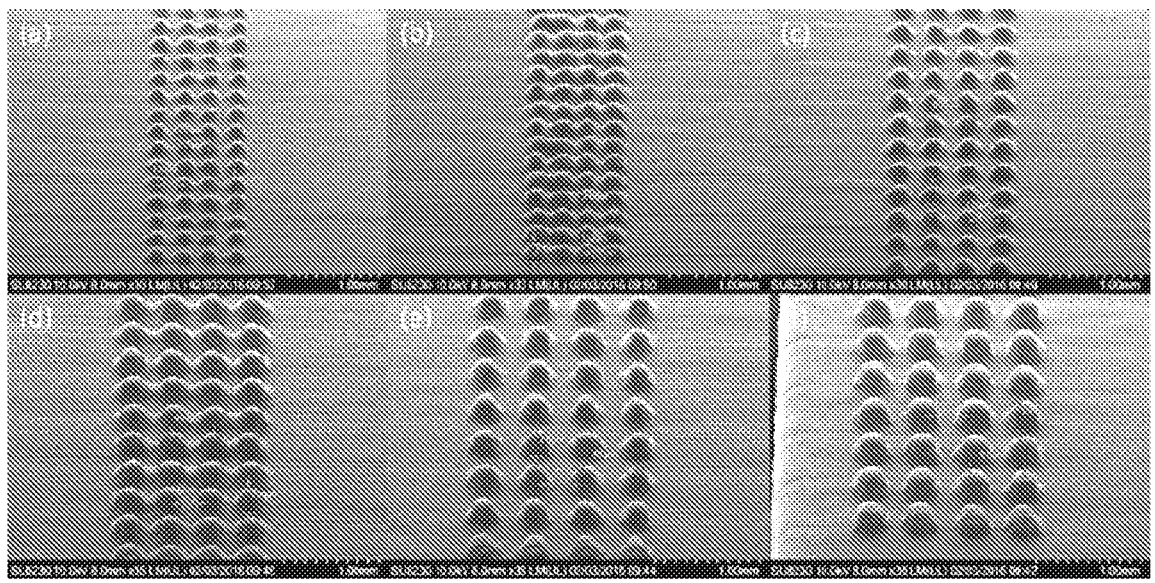
FIG. 6 depicts microscope images of various arrays of columns spaced apart at different distances, in accordance with an example embodiment of the presently disclosed technology.
Figure 7:
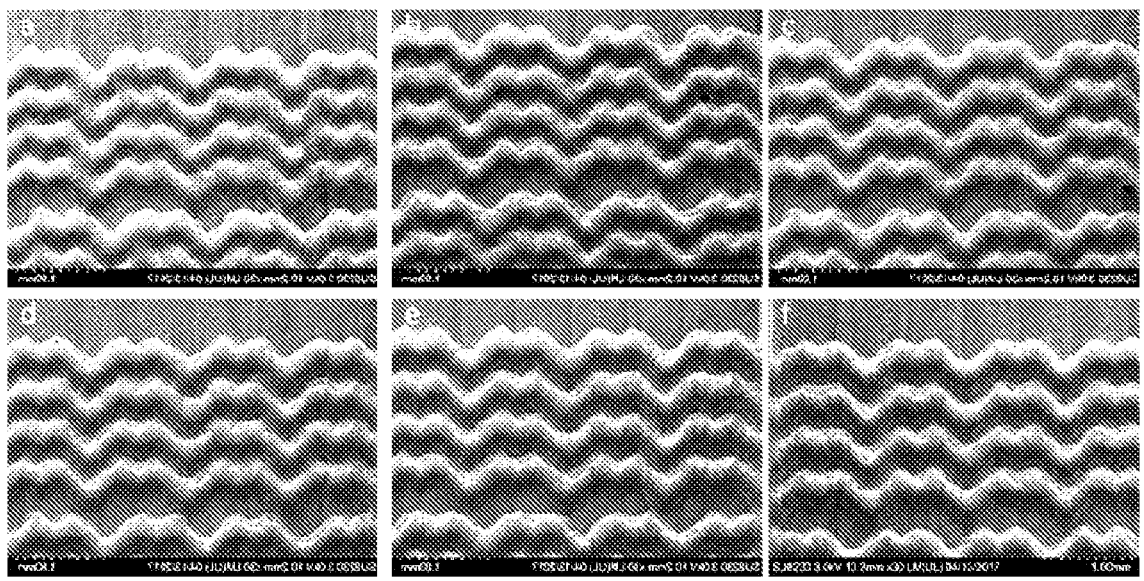
FIG. 7 depicts microscope images of various arrays of herringbone structures spaced apart at different distances, in accordance with an example embodiment of the presently disclosed technology.

Different geometries may be used, including differing column diameter, column period (i.e., the distance between the respective centers of adjacent columns), and the channel height. In some embodiments, the channels 204 may have a height in the range of 50 µm to 500 µm. For example, some embodiments may include channels 204 having a height of 100 µm, 150 µm, 200 µm, 300 µm, or 400 µm. In some embodiments, the column diameter may be 100 µm, 150 µm, 200 µm, 250 µm, or any other suitable diameter. In some embodiments, the column period may be in the range of 30 µm to 100 µm, and in some embodiments, the column period may be in the range of 100 µm to 200 µm. According to some embodiments, the column period may be upward of 200 µm to 500 µm. The column period may be of any other suitable distance, provided the column period is not so narrow that the microfluidic layers might become clogged with white blood cells, which typically have a diameter of approximately 10 µm to 12 µm. FIG. 6 depicts rows of columns having differing column periods. Certain embodiments may include columns 410 that are positioned in a location offset in the X-direction or Y-direction with respect to the location of adjacent columns 410. In some embodiments, the offset distance may be 50 µm, 100 µm, 150 µm, 200 µm, or any other suitable distance. Some embodiments may include larger or smaller column diameter, column period, and/or channel height than those listed above, depending on factors such as desired use and manufacturing capability. By controlling the column diameter and the period of the columns 410 (and thus the distance between adjacent columns 410), whole blood can flow through the internal matrix with minimal shear stress on the cells in the whole blood, all while increasing the likelihood that the white blood cells of the whole blood will touch the chemically functionalized columns 410 or other chemically functionalized surfaces of the internal matrix 202. This may increase the capture efficiency of the internal matrix 202 with respect to white blood cells. Additionally, the columns may be dimensioned and positioned such that size-based separation of white blood cells or other particles from the blood is possible. That is, the columns 410 may be configured to mechanically separate a target particle from the blood sample (depending on the size of the target particle in comparison to the spacing between adjacent columns and the relative size of other particles within the blood sample) without relying on surface chemistry and/or immunoaffinity separation alone. Some embodiments may include a herringbone structure, as shown in FIG. 7. The width of the herringbone structure may be 150 µm, 160 µm, 175 µm, 185 µm, 195 µm, 205 µm, 215 µm, 225 µm, 235 µm, 245 µm, or any other suitable width. The periodicity of herringbone structures may be in the range of 400 µm to 600 µm, or any other suitable distance. For instance, the herringbone structures depicted in panels a-f of FIG. 7, correspond to a) 437.5 µm, b) 455 µm, c) 472.5 µm, d) 490 µm, e) 507.5 µm, and f) 525 µm.

Channel height, in some embodiments, may be in the range of 100 µm to 200 µm, or any other suitable height. For example, some embodiments may have a channel height of 100 µm, 125 µm, 150 µm, 175 µm, or 200 µm.

Some embodiments may include apertures or holes 512 between adjacent channels 204 or between adjacent microfluidic layers 206, which may assist in balancing pressure between the channels 204 and may promote inner mixing within the inner matrix 202. Increased inner mixing may increase the likelihood of interaction of white blood cells with chemically functionalized surfaces.

Certain embodiments may include different microfluidic layers 206, or different channels 204 within a microfluidic layer 206, that are chemically functionalized with different antibodies to each target and capture different cells in each microfluidic layer 206 or channel 204. This may be useful in gathering statistical data in the fluid or other fluid of interest, such as whole blood or an ascites solution from ovarian cancer patients. In some embodiments, a different method of depletion may be employed on each microfluidic layer 206, such that different methods of depletion can be integrated onto the same microfluidic device 102 and be used simultaneously. For example, some embodiments may use magnetic beads, acoustical depletion methods, or electrical depletion methods.

Figure 8:
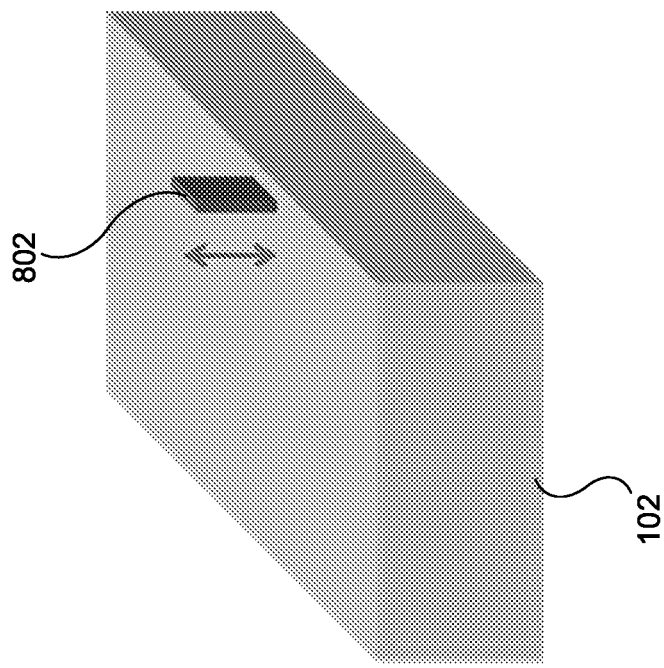
FIG. 8 depicts a microfluidic device having removable microfluidic layers, in accordance with an example embodiment of the presently disclosed technology.
Figure 8:
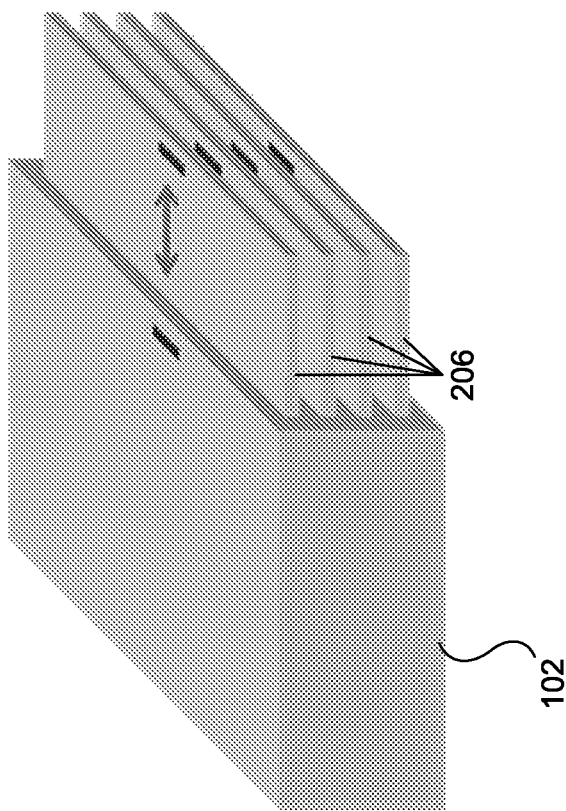

In some embodiments, the microfluidic layers 206 may be removable, as shown in FIG. 8. For instance, it may be useful to positively deplete (i.e., remove targeted cells directly from the sample) CTCs or other rare blood cells from a blood sample or other solution. Some embodiments may include a locking mechanism 802 such that while the microfluidic device 102 is being chemically functionalized or is capturing targeted cells, each microfluidic layer 206 can be locked in placed and sealed to prevent leakage. In such embodiments, once cells capture is complete, the locking mechanism 802 may be unlocked and each microfluidic layer 206 (now containing captured cells) can be removed from the microfluidic device 102.

Microfluidic Device Construction

Methods to create various embodiments of microfluidic devices will now be discussed. Certain embodiments may be created with the assistance of an additive manufacturing device, for example a 3D printer. Generally, an additive manufacturing device constructs an object by incrementally depositing layers of print material. Some additive manufacturing devices deposit a sacrificial support material to support the print material constructing any overhanging features of the object. Generally, the sacrificial support material must be mechanically removed or dissolved upon completion of the object. Typically, the sacrificial support material is a different material than the print material. In some instances, the sacrificial support material is a wax, such as the wax used by a ProJet 3510 3D printer. Removing the sacrificial support wax may be referred to as dewaxing.

After creating the microfluidic device with an additive manufacturing device, the microfluidic device 102 (along with any sacrificial support material, such as wax) may be placed in an oven, which may remove most of the wax outside of the device. In some embodiments, the temperature of the oven may be set in the range of approximately 60° C. to approximately 70° C. In certain embodiments, the temperature of the oven may be set to approximately 65° C. In some embodiments, the microfluidic device 102 and sacrificial material may be left in the oven for approximately 30 minutes to 90 minutes. In some embodiments, the microfluidic device 102 may be left in the oven for approximately 90 minutes to approximately 3 hours. According to some embodiments, the microfluidic device 102 and sacrificial material may be left in the oven for approximately 60 minutes.

In some embodiments, tubes may be connected to the inlet 104 and the outlet 106 of the microfluidic device 102; according to some embodiments, a bonding agent, such as epoxy, may be used to tightly attach the tubes to the microfluidic device 102 and may seal any gaps between the tubes and the microfluidic device 102. With the tubes tightly connected, the microfluidic device 102 may then be placed in a bath of hot liquid, such as water or some other liquid of approximately equivalent viscosity. Using a liquid of viscosity approximately equal to that of water may contribute to preventing damage from occurring to the channels 204 of the internal matrix 202 of the microfluidic device 102 during the dewaxing process. In some embodiments, the bath of hot liquid may be boiling. In some embodiments, hot liquid may be flushed through the microfluidic device. In some embodiments, a negative pressure may be applied to the microfluidic device by a negative pressure source in conjunction with the hot liquid flushing. According to certain embodiments, syringes may be connected to the opposite end of the inlet tube and the opposite end of the outlet tube. In some embodiments, the syringe connected to the inlet tube is initially holding a quantity of hot liquid, and the syringe connected to the outlet tube is initially empty. In some embodiments, the outlet syringe may be pulled to create a negative pressure, and the inlet syringe may inject the hot liquid into the microfluidic device 102. In certain embodiments, the outlet syringe is initially holding a quantity of hot liquid, and the inlet syringe is used to create a negate pressure. In certain embodiments, the inlet syringe may inject the hot liquid into the microfluidic device 102. In some embodiments, the syringe may inject the hot liquid into the microfluidic device 102 at a constant rate. For example, in some embodiments, the inlet syringe may be placed on a syringe pump that is programmed to inject the hot liquid into the microfluidic device 102 at a rate of approximately 10 mL/hour.

According to certain embodiments, after the microfluidic device 102 has been flushed with 10 mL of hot liquid, the same technique may be repeated using a bath of hot mineral oil. In some embodiments, the mineral oil bath may have a temperature of approximately 60° C. to approximately 75° C. In some embodiments, the mineral oil bath may have a temperature of approximately 75° C. to approximately 85° C., such as 80° C. In certain embodiments, the mineral oil may have a temperature of approximately 85° C. to approximately 100° C. Because wax is generally soluble in oil-based solutions, mineral oil may assist in removing sacrificial support wax material from the microfluidic device 102. Other chemicals may be used to assist in removal of the sacrificial support wax material. For example, certain embodiments may use acetone and/or isopropanol in lieu of, or in addition to, mineral oil. In certain embodiments, the dewaxing process may use any number of flushing steps using any combination of the above discussed chemicals and/or liquids. In some embodiments, a cleansing flush may be made after the final flushing step. According to some embodiments, the cleansing flush may include the step of flushing 10 mL of soapy water through the microfluidic device 102. In some embodiments, the cleansing flush may include the step of flushing 10 mL of water through the microfluidic device 102. In certain embodiments, a cleansing flush may be carried out between each flushing step.

In some embodiments, the microfluidic device 102 may be chemically functionalized to positively deplete targeted cells from whole blood (i.e., capture the targeted cells, such as CTCs or other rare cells, directly). Certain embodiments may be configured to achieve this functionality by only partially dewaxing the microfluidic device 102 (i.e., purposely leaving a thin layer of wax at the top surface, bottom surface, side surfaces, or any combination thereof). To only partially dewax the microfluidic device 102, according to some embodiments, the microfluidic device 102 may be flushed with hot water. This may allow a thin layer of wax on some or all channel surfaces 204. The microfluidic device 102 may then be chemically functionalized with an antibody known to interact (and capture) the surface chemistry of the targeted cells. During functionalization, the interior matrix of the microfluidic device 102, including the remaining wax, is coated with the antibody. Thus, after whole blood has been run through the microfluidic device 102, the remaining wax (and targeted cells captured by the antibody), may be thermally released from the microfluidic device 102. The thermal release may be achieved by flushing with hot water, flushing with other chemicals, or placing in an oven, provided the temperature and/or chemicals involved do not harm the targeted cells.

Figure 9A:
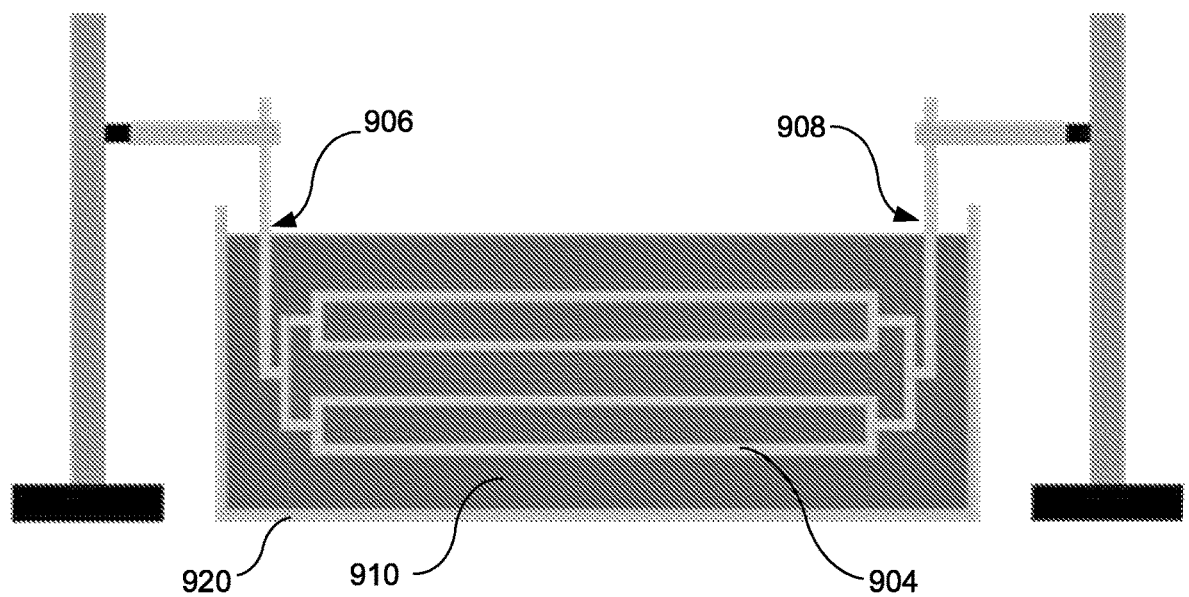
FIG. 9A depicts a schematic view of a system for molding a microfluidic device, in accordance with an example embodiment of the presently disclosed technology.
Figure 9B:
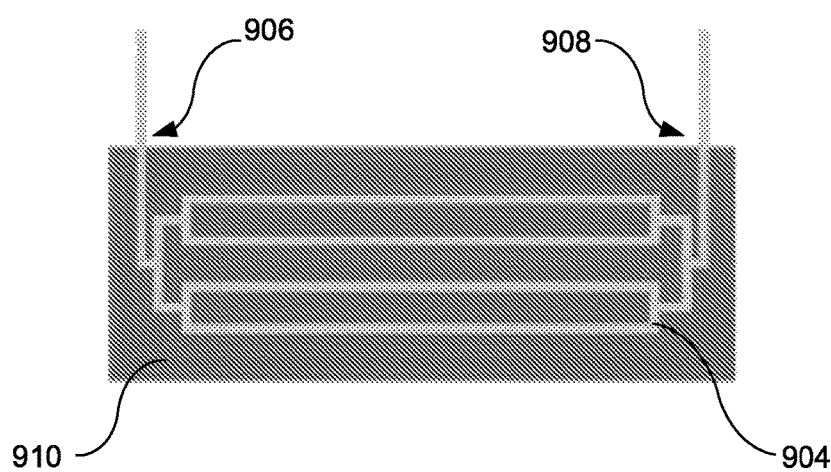
FIG. 9B depicts a schematic view of a cured mold of a microfluidic device, in accordance with an example embodiment of the presently disclosed technology.
Figure 9C:
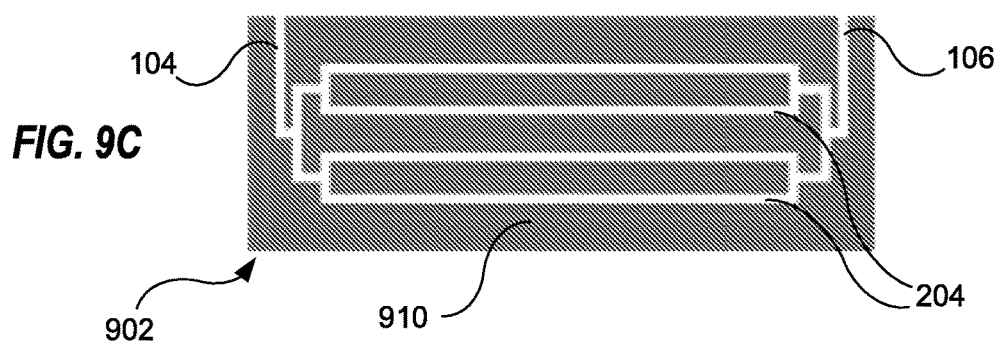
FIG. 9C depicts a schematic view of a molded microfluidic device with the mold removed, in accordance with an example embodiment of the presently disclosed technology.

Referring to FIGS. 9A-9C, certain embodiments may include parallel microfluidic channels in polydimethylsiloxane (PDMS). According to some embodiments, the microfluidic channels may be printed in wax and may be used as a negative template for PDMS molding. Referring to FIG. 9A, a wax template 904 of microfluidic channels may be suspending in a container 920, and PDMS 910 may be poured into the container 920, such that the PDMS 910 encloses the entirety of the wax template 904 except for the inlet portion 906 and the outlet portion 908 of the mold. Referring to FIG. 9B, the mold may be moved from the container 902 after the PDMS 910 is fully cured, and the mold may be heated, melting the wax template 904 and leaving a microfluidic device 902 made of PDMS 910. This may result in stacked microfluidic channels 204 in PDMS 910, which is not possible with conventional soft lithography techniques.

Figure 10:
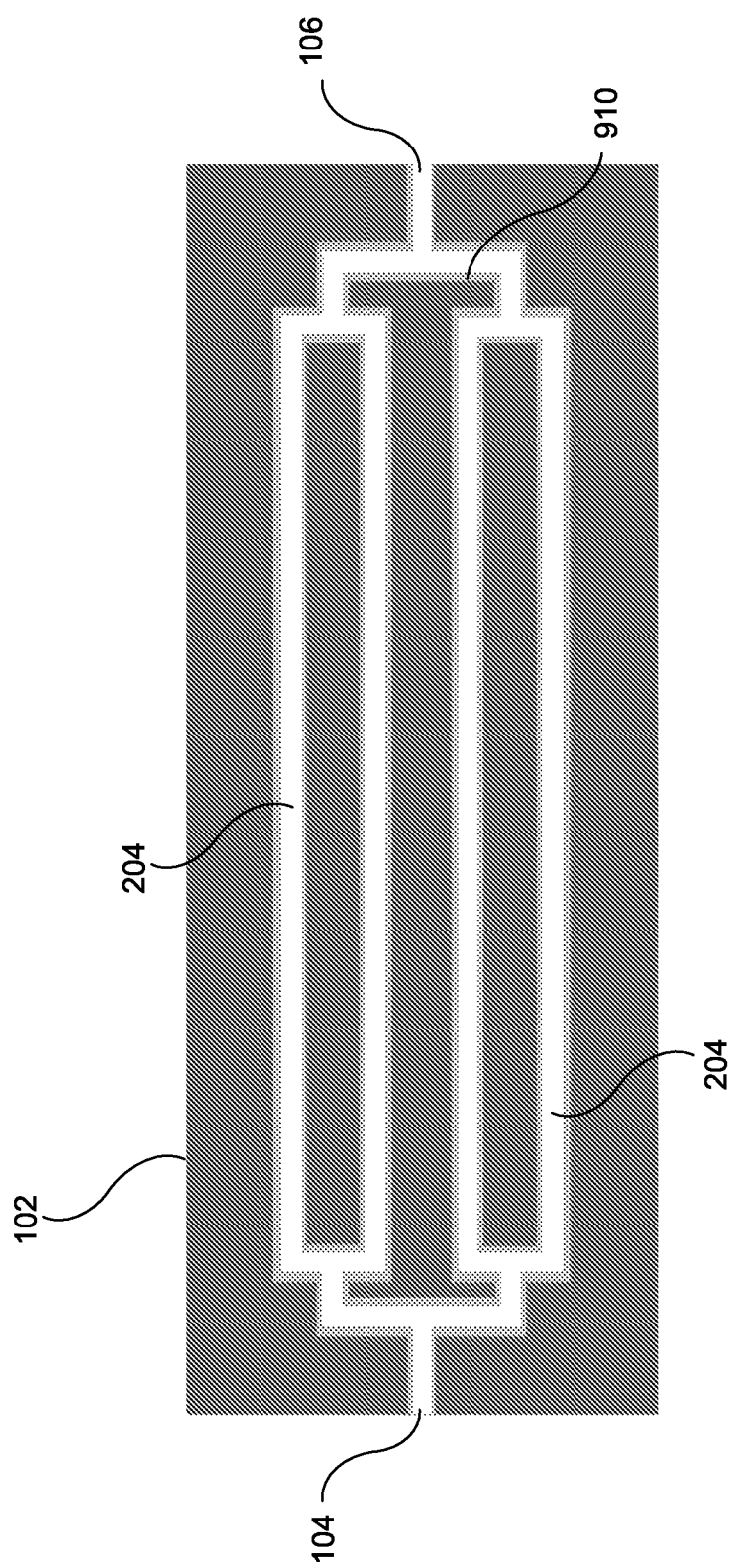
FIG. 10 depicts a schematic view of a microfluidic device having coated channels, in accordance with an example embodiment of the presently disclosed technology.

In some embodiments, such as the embodiment depicted in FIG. 10, a microfluidic device may be internally coated with PDMS 910. This may provide increased control over the thickness and/or surface roughness of the channels 204 and may facilitate adherence of antibodies to the internal matrix during the functionalization process as PDMS may have the capability to be effectively functionalized with an antibody. Certain embodiments may achieve this by dewaxing the internal matrix 202 of the microfluidic device 102 and subsequently flushing the internal matrix 202 with uncured PDMS 910. In some embodiments, an air source may be connected to the inlet 104 of the microfluidic device 102, and in some embodiments, the air source may provide a continuous airflow. In certain embodiments, this may allow PDMS 910 to coat at least some portion of the internal matrix 202, but may force out excessive PDMS 910 from the outlet 106 of the microfluidic device 102. The thickness of the PDMS 910 coating on the surface of the channels 204 can be controlled by the air pressure at the inlet 104. According to some embodiments, the air pressure can be in the range of 10 mbar to 1000 mbar. The PDMS 910 may then be allowed to cure, resulting in a PDMS 910 coated internal matrix 202.

Figure 11:
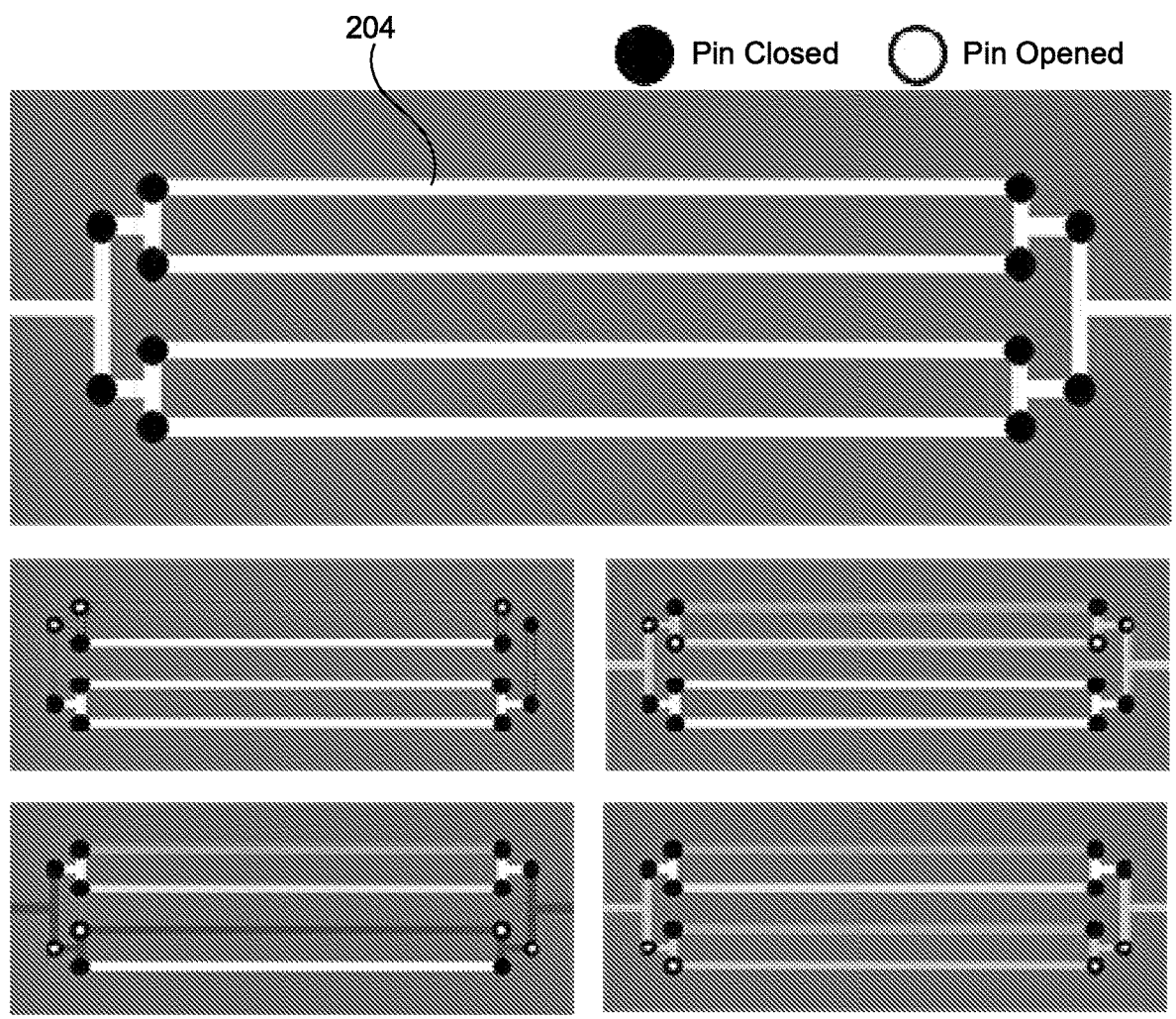
FIG. 11 depicts a schematic view of a system for chemically functionalizing different portions of a microfluidic device with different antibodies, in accordance with an example embodiment of the presently disclosed technology.

As mentioned above, certain embodiments of the microfluidic device 102 may comprise microfluidic layers 206 that are each chemically functionalized with different antibodies, such that different cells are targeted and captured in each layer. According to some embodiments and as shown in FIG. 11, this may be achieved by inserting a pin at each channel 204 junction, such that the pins act like valves. FIG. 11 depicts each junction as having either a solid dot, which corresponds to an inserted pin at that particular junction such that the junction is closed, or a hollow dot, which corresponds to a removed pin at that particular junction such that the junction is open. By inserting or removing the pins, a particular antibody may be selectively applied to a desired microfluidic layer or a segment of a microfluidic layer.

Hydrogel-Based Cell Isolation

According to some embodiments, the microfluidic device may utilize an affinity chromatography for depletion of white blood cells or other targeted cells directly from unprocessed whole blood using a hydrogel (i.e, macroporous polymeric materials). Some embodiments may use an acrylamide (AAm) hydrogel. In certain embodiments, the interconnected character and the pore size of the hydrogel matrix (e.g., pore sizes of approximately 50 µm to 100 µm, according to some embodiments) allows for processing whole blood without blocking the hydrogel matrix and/or hindering continued flow of cells through the microfluidic device. According to certain embodiments, the AAm hydrogel matrix may be chemically functionalized with CD45 antibodies, which may specifically deplete white blood cells from the whole blood, thus enhancing the purity/concentration of the CTCs captured by the filter. In certain embodiments, NeutrAvidin conjugated AAm hydrogel may have a high surface area to volume ratio and may efficiently deplete white blood cells from whole blood via immunoaffinity. This process may allow a subsequent filter to mechanically capture CTCs or rare cells existing in the whole blood.

In some embodiments, macroporous hydrogels (i.e., cryogels) may be synthesized in semi-frozen aqueous media where ice crystals act as porogen and a template for an interconnective, highly porous structure (sponge like morphology) after melting. When the solvent is frozen, dissolved monomer or polymer precursors may be concentrated in small non-frozen regions, where the gel-formation continues. Cryogels may have porosity up to 90%, an average pore size of approximately 10 µm to 200 µm, and excellent mechanical properties. The average pore size may depend on factors including the initial concentration of precursors, their physicochemical properties, and freezing conditions. Cryogels may typically be prepared from any synthetic or natural hydrophilic polymers such as polyacrylamide, acrylamide, cellulose, gelatin, chitosan, or agarose that form gels. Cryogels may be suitable as matrices for cell separation due to the combination of elasticity with interconnected pores that may be large enough to allow movement of large particles such as mammalian cells. The interconnected porous structure in cryogel typically has a high surface to volume ratio and flexibility in the diameter and/or height of the column.

Figure 12:
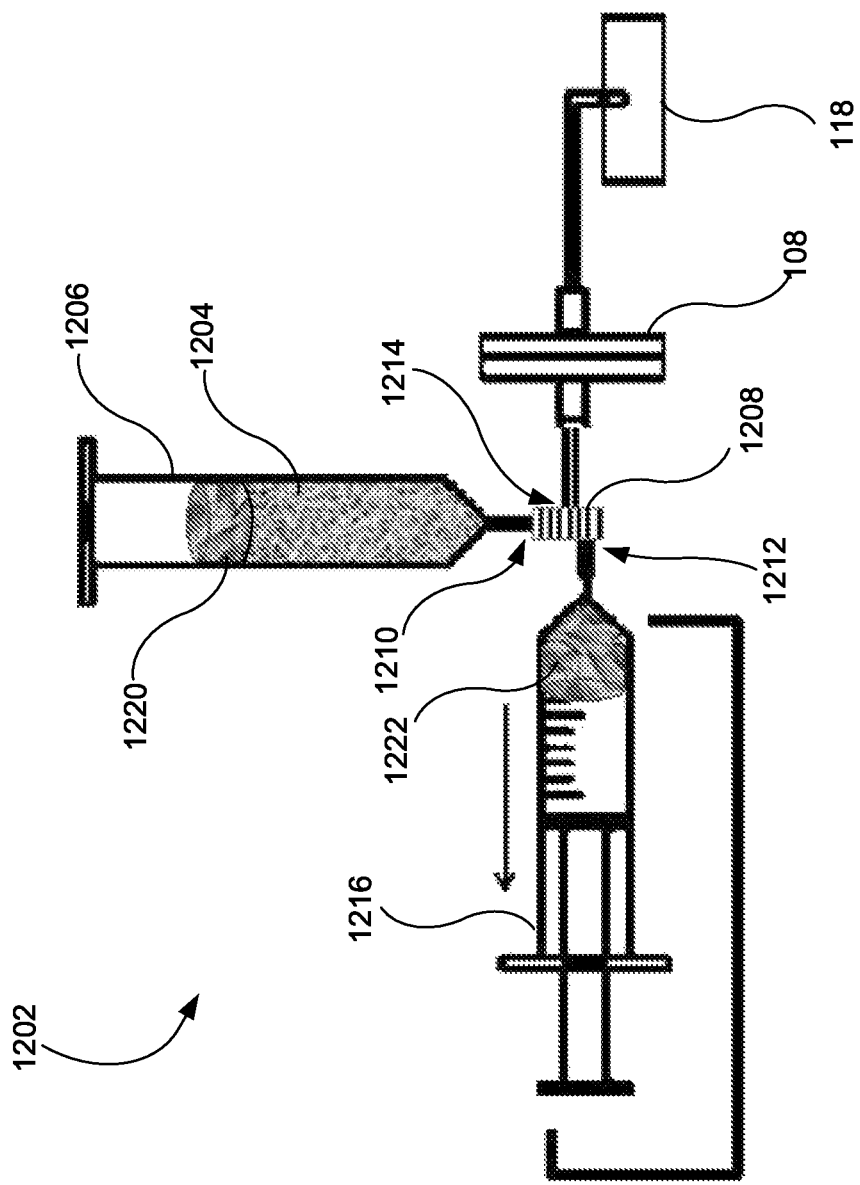
FIG. 12 depicts a schematic view of a cell-screening system, in accordance with an example embodiment of the presently disclosed technology.

Referring to FIG. 12, in some embodiments, a cryogel-based microfluidic device 1202 can deplete white blood cells out of whole blood 1220. Such embodiments relate to a cryogel-based affinity chromatography, which may be capable of capturing target cells through affinity ligands while other cells pass through the cryogel matrix with little to no mechanical entrapment. In some embodiment the cryogel matrix 1204 may be chemically functionalized.

In certain embodiments, such as the embodiments shown in FIG. 12, a chemically functionalized cryogel matrix 1204 can be positioned in a syringe 1206 that can be connected to a three-way valve 1208. The first opening 1210 of the valve 1208 can be connected to the syringe 1206, the second opening 1212 can be connected to a syringe pump 1216, and the third opening 1214 can be connected to a filter 108. The valve 1208 may have a first position wherein a pathway is opened between the first opening 1210 and the second opening 1212 and wherein the third opening 1214 is closed. The valve may also have a second position wherein a pathway is opened between the second opening 1212 and the third opening 1214 and wherein the first opening 1210 is closed. The syringe pump 1216 can be configured to pull, via negative pressure, the whole blood 1220 through the cryogel matrix 1204. In some embodiments, the syringe pump 1216 may pull, via negative pressure, the whole blood 1220 through the cryogel matrix 1204 at a constant rate. In some embodiments, the syringe pump 1216 can be configured to push white-blood-cell-depleted blood 1222 to the filter 108. The filter 108 may capture CTCs or other rare cells and may collect any remaining white blood cells. The pore size of filter 108 may be selected based on the size contrast between the CTCs and white blood cells, red blood cells, platelets, or the like. For example, the filter 108 may be selected such that, the filter 108 may allow all red blood cells and platelets in the blood to pass through the filter and into the waste container 118, while capturing CTCs and/or remaining white blood cells. Filtration pressure may be selected to ensure high cell viability. In certain embodiments, the filtration pressure can be in the range of 10 mbar to 300 mbar, such as 100 mbar. In some embodiments, the filtration pressure can be selected based, at least in part, on the pore size of the filter.

Supermacroporous Monolithic NeutrAvidin-Cryogel Affinity Column Preparation

In an example implementation, to prepare an epoxy functional cryogel matrix, 100 mL of distilled water was degassed in a vacuum filter flask under constant stirring for approximately 15 minutes. Four grams of acrylamide (AAm) and 1 mL of allylglycidyl ether (AGE) were mixed in 100 mL of degassed water. Next, 1 g of N, N-methylenebisacrylamide (MBAAm) was dissolved in monomer solution as a crosslinking agent. The mixture was kept under $N_2$ purging for approximately 15 minutes to remove dissolved oxygen, and the mixture was then cooled to a temperature in the range of 0° C. to 4° C. Degassing of water and purging of $N_2$ may help to remove $O_2$ to inhibit free-radical polymerization, and cooling the mixture may help to retard the free-radical reaction. Then 110 mg of ammonium persulfate (APS) was added followed by 95 µL of N, N, N', N'-tetramethyleneethylenediamine (TEMED) as an initiator/activator agent to the mixture. The mixture was stirred for 30 seconds and quickly poured into pre-cooled 5 mL plastic syringes (diameter 12.06 mm). The cryogel columns were stored at −12° C. in a refrigerated circulating bath for 12 hours. After 12 hours of incubation, the columns were thawed with water at room temperature and washed with water and a water/ethanol mixture several times to remove any unreacted monomers. After washing, the cryogel columns were stored at 4° C. until the next step.

To prepare the NeutrAvidin cryogel affinity matrix, the cryogel columns were washed with water and then with 0.2M $Na_2CO_3$ (pH>10). Ethylenediamine (0.5M in 0.2M of $Na_2CO_3$) was then run through the column for approximately 4 hours. The columns were then washed with water until the pH became approximately neutral and were then were flushed with 0.1M sodium phosphate buffer (pH 7.4). Next, 5% glutaraldehyde in 0.1M sodium phosphate buffer was run through the columns for approximately 5 hours as a crosslinking agent. The cryogel columns were washed several times with distilled water to remove excess glutaraldehyde. Then, the columns were incubated overnight with NeutrAvidin (1 mg/mL) in 0.1M sodium phosphate buffer at 4° C. The following day, the NeutrAvidin-cryogel matrix was washed with freshly prepared 0.1M of sodium borohydride ($NaBH_4$) in sodium carbonate buffer (pH 9.2) to reduce Schiff's base formation between the protein and the aldehyde. Finally, the NeutrAvidin-cryogel columns were washed with water and stored at 4° C. until their next usage. To chemically functionalize the matrix, the NeutrAvidin-cryogel columns were incubated with CD45 antibody for approximately 1 hour. The cryogel columns were then washed several times.

To run whole blood samples through the CD45 affinity cryogel columns, an empty 5 mL syringe was placed in syringe pump and connected to the cryogel syringe. The cryogel column was equilibrated with a balanced salt solution before the injection of whole blood. One mL of whole blood was added to the cryogel column. The syringe pump was set to refill mode to collect a blood sample at 0.5 mL/min flow rate, thus applying negative pressure to the cryogel syringe. Finally, Turk solution was used to calculate the depletion percentage of white blood cells.

White blood cells were counted after the whole blood running through the cryogel columns. A control experiment was performed in which the matrix was not chemically functionalized with an antibody. The depletion rate of white blood cells from a whole blood sample in two trials using chemically functionalized cryogel was 81.4% and 86.7%, respectively, while the control experimented yielded a depletion rate of just 4.3%.

To test the uniform distribution of pores through the cryogel, different colors of food coloring were loaded on the column in order. The different colors were observed moving through the column without mixing, indicating a high distribution of pores through the cryogel. To test the pore size of the cryogel matrix, whole blood was run through the column. It was observed that red blood cells moved through the monolithic cryogel column without being mechanically trapped.

For both printed microfluidic devices and hydrogel-based devices, fluorescent tagging of the rare or cancer cells may also be performed after the targeted cells have been captured by the filter. Knowing the surface chemistry of the targeted cells, according to some embodiments, a fluorescent-tagged antibody can be flushed through the microfluidic device and the filter at a very slow flow rate, which may tag the targeted cells while they are in place on the filter or captured in the device. For example, by flushing a fluorescent-tagged anti-CD45 antibody through the microfluidic device and filter (which were previously been chemically functionalized with an anti-CD45 antibody), it may be possible to see how many white blood cells on the filter have the CD45 surface antigen. This may permit a better understanding of how and/or why the white blood cells on the filter were not captured by the microfluidic device. If none (or a minimal and/or negligible amount) of white blood cells on the filter express fluorescent light after a fluorescent-tagged anti-CD45 antibody has been flushed through, then it may indicate that the chemically functionalized microfluidic device failed to capture these white blood cells because those cells do not have CD45 antigens on their respective surfaces. This may assist in better quantifying the capture efficiency of the device and may provide useful information for future examinations.

Turk's blood diluting fluid can be used to lyse red blood cells and to fluorescent-tag any white blood cells on the filter and in the waste container to facilitate counting of the white blood cells for calculation of the capture efficiency of the microfluidic device and the filter effectiveness of the filter pore size. After the red blood cells are lysed with Turk's solution, the nuclei of the white blood cells may be stained. By counting the number of white blood cells on the filter and in the waste container, the capture efficiency and filter effectiveness can be determined.

Some embodiments may include removing the CTCs or rare blood cells from the filter. After passing the whole blood sample through a chemically functionalized microfluidic device, the filter may contain CTC and/or rare blood cells and/or any white blood cells that were not depleted by the microfluidic device. The filter may be chemically functionalized with an anti-CD45 antibody, such that any white blood cells the reach the filter will be captured by the filter. According to some embodiments, an inverse flow (i.e., in the opposite direction of flow as the direction of flow of the whole blood sample passing through the microfluidic device and into the filter) of liquid may be applied to the filter, such that the CTCs and/or rare cells (but not the white blood cells, which may be captured by the chemically functionalized filter) can be removed from the filter and collected for further analysis. Certain embodiments may use a biotin and avidin interaction to bind the desired antibody to the surface of the inner walls, some embodiments may chemically functionalize the device with different biotinylated antibodies including CD3, CD34, CD66b, and so on, which may also allow the microfluidic device to capture white blood cells. Also, this may enable the microfluidic device to capture different types of T-cells, cancer cells, CTCs, or any other kind of particle. This is because different types of cells express different antigens on their respective surfaces, and by using different types of antibody, certain embodiments can selectively deplete the desired types of cells from the whole blood or other fluid sample of interest.

Certain embodiments may use filters having an average pore size ranging from 1 μm to 5 μm, and the pore size may be at least in part based on the inlet pressure used to input the whole blood sample into the microfluidic device. In some embodiments, the necessary filter may be in the range of 13 mm to 47 mm, depending on the volume of the blood or other fluid being processed. Certain embodiments of the present invention connect to a commercially available filter (which may or may not be chemically functionalized prior to use).

Functionalization of Microfluidic Devices

According to some embodiments, microfluidic devices are chemically functionalized, wherein a variety of chemicals may be used to modify the surface chemistry of the microfluidic device. This may enable the microfluidic devices to deplete white blood cells or other targeted cells with an antibody. In some embodiments, the channel surfaces in the internal matrix of the microfluidic device may be activated. According to some embodiments, this may be achieved by using a corona discharge tool to attach a layer of hydroxyl (—OH) group attached to at least some of the channel surfaces.

Certain embodiments may include a microfluidic device of transparent or translucent material, and in such embodiments, the microfluidic device may be exposed to ultraviolet (UV) light for surface activation in lieu of, or in addition to, the corona discharge tool method discussed above. Regarding the UV method, water may injected into the microfluidic device, according to some embodiments. This may better guide the UV light to the channel surfaces, which may cause at least some of the channel surfaces to bind to an alkoxysilanes group through chemical binding. Two forms of an alkoxy group are methoxy (—$OCH_3$) and ethoxy (—$OCH_2CH_3$), which the 3-mercaptopropyl trimethoxysilane (MPTMS).

In some embodiments, after the channels of the microfluidic layers have been coated with a layer of —OH, the microfluidic device may be incubated at approximately room temperature. In some embodiments, the microfluidic device may be incubated or approximately an hour; in some embodiments, the microfluidic device may be incubated for a duration of time in the range of 30 minutes to 2 hours. In certain embodiments, after incubation, MPTMS may be mixed in ethanol with mixing 4% (v/v) and may be flushed through the microfluidic device. In some embodiments, after flushing the microfluidic device with the MPTMS, the methyl group (—$CH_3$) of the ethoxy group in the MPTMS may bind to the hydroxyl group on the surface of the channels of the microfluidic layers; the sulfhydryl groups (—SH) on the other end may then be available to become bound to N-γ-maleimidobutyryl-oxysuccinimide ester (GMBS). In some embodiments, a quantity of GMBS may be mixed with dimethyl sulfoxide (DMSO). In certain embodiments, 50 mg of GMBS may be mixed with 0.5 mL DMSO to be stored as a stock solution. In some embodiments, after incubation, the device may be cleaned with an ethanol flushing, flushed with 0.28% (v/v) of GMBS stock solution and ethanol. In some embodiments, the microfluidic device may then be further incubated for approximately 30 min at approximately room temperature. One end of the GMBS may include N-hydroxysuccinimide (NHS) ester group and the other end may include of maleimide reagent; the NHS may be available to become bound to the primary amine groups (—$NH_2$), and the maleimide reagent may be available to become bound to —SH groups. Thus, by flushing the GMBS after the MPTMS, the maleimide reagent from the GMBS may bind to the —SH group from the MPTMS, and the NHS ester group can be used to bind to any molecule that has the —$NH_2$ group. —$NH_2$ group may be the terminal of many amino acids, which can also be found in the lysine residue on the NeutrAvidin protein, which may allow the neutravidin to bind to NHS ester group from GMBS. In some embodiments, an ethanol flush may be conducted to remove residual GMBS, and a phosphate buffer saline (PBS) rinse may be conducted to remove any remaining ethanol. In some embodiments, approximately 10 μg/mL of NeutrAvidin in PBS solution may be flushed though the microfluidic channels and may be incubated for at least 1 hour. This may allow NeutrAvidin to become attached to the GMBS. In certain embodiments, by avidin-biotin interaction, a biotinylated anti-CD45 antibody can become bound to the neutravidin, which may form an avidin-biotin complex. According to some embodiments, after incubation and after cleaning the channels with PBS, CD45 may then be flushed through the microfluidic device, which may for a coat on top of the NeutrAvidin. In some embodiments, the microfluidic device may then be incubated for approximately an hour at approximately room temperature. In certain embodiments, the microfluidic device may be flushed with PBS to remove unattached CD45. The microfluidic device is thus prepared to receive a flow of whole blood or other fluid sample of interest and will be configured to deplete the fluid sample of leukocytes.

In certain embodiments, the fluid sample (e.g., a whole blood sample) may be incubated with the anti-CD45 antibody, which may allow the white blood cells to bind with the antibody. The fluid sample may then be introduced to the microfluidic device, at which time the leukocytes may be captured by the channel surfaces within the microfluidic device via biotin-avidin interactions. This may allow the cells expressing CD45+ to have a chance to bind with the anti-CD45 antibody prior to introduction to the microfluidic device. Because the biotin-avidin interaction is very quick, this may assist in achieving a higher depletion rate.

In some embodiments, the neutravidin may be applied to the microfluidic device without having first activated the surfaces of the channels within the microfluidic device. This may provide a satisfactory, albeit less strong, binding of the neutravidin on the channel surfaces of the microfluidic device.

Experimental Results

In an example implementation, an example microfluidic device was first tested with the Jurkat cell line, which expresses CD45+, to observe whether the example functionalized microfluidic devices can successfully deplete the Jurkat Cells. The example functionalized device captured a high percentage of Jurkat cells injected into the device, while the collected waste included only a small number Jurkat cells (i.e., non-captured cells). Jurkat cells were also injected into an example non-functionalized microfluidic device. The example non-functionalized non-functionalized microfluidic device captured some cells with non-specific binding, but compared to the collected waste, the number of cells captured by the example non-functionalized microfluidic device was comparatively low. This tends to show that chemically functionalized microfluidic devices are able to capture most of the cells that have an expression of CD45+ through antibody and antigen interaction.

The Jurkat cells were captured on the surfaces of the chemically functionalized print material (i.e., the material used to create later prototypes of the microfluidic device) by a small amount of nonspecific binding of the Jurkat cells in the example non-functionalized microfluidic device. After testing the Jurkat cells on the open surface of the print material, Jurkat cells were injected into an example functionalized microfluidic device. Tests were conducted with different flow rates, the results of which are shown below in Table 1.

TABLE 1

| Flow Rate (mL/h) | Depletion (%) |
| --- | --- |
| 0.5 | >99.000 |
| 1 | 91.026 |
| 2 | 93.206 |
| 4 | 84.695 |
| 10 | 50.971 |

While certain implementations of the disclosed technology have been described in connection with what is presently considered to be the most practical implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A device comprising:
    a microfluidic chamber comprising:
        an outer surface defining an interior volume of the microfluidic chamber;
        a first microfluidic layer positioned in the interior volume of the microfluidic chamber, the first microfluidic layer having a first plurality of apertures;
        a second microfluidic layer positioned in the interior volume of the microfluidic chamber adjacent to the first microfluidic layer, the second microfluidic layer having a second plurality of apertures, the second plurality of apertures being concentric to the first plurality of apertures in the first microfluidic layer; and
        a plurality of columns positioned in the interior volume of the microfluidic chamber, at least some of the columns positioned within the concentric apertures of the first microfluidic layer and second microfluidic layer and extending from a bottom surface of the interior volume of the microfluidic chamber to a top surface of the interior volume of the microfluidic chamber.

2. The device claim 1, wherein the first microfluidic layer further has an internal volume and a first array of microscale structures positioned in the internal volume of the first microfluidic layer; and
    wherein the second layer further has an internal volume and a second array of microscale structures positioned in the internal volume of the second microfluidic layer.

3. The device of claim 1, wherein at least some of the columns are isolated from contact with the first microfluidic layer and the second microfluidic layer.

4. The device of claim 1, wherein each of the first and second microfluidic layers further comprise a channel having a height of approximately 100 μm.

5. The device of claim 2, wherein at least some of the microscale structures of the first array of microscale structures have a diameter in the range of approximately 100 μm to approximately 250 μm.

6. The device of claim 2, wherein at least some of the microscale structures of the first array of microscale structures are positioned at a period in the range of approximately 100 μm to approximately 500 μm.

7. The device of claim 2, wherein the microscale structures of the first array of microscale structures are herringbone structures.

8. The device of claim 7, wherein the microscale structures of the first array of microscale structures have a width in the range of approximately 150 μm to approximately 245 μm.

9. The device of claim 7, wherein the microscale structures of the first array of microscale structures are positioned at a period in the range of approximately 400 μm to approximately 600 μm.

10. The device of claim 1, wherein at least one of the first microfluidic layer and the second microfluidic layer is removably attachable to the interior volume of the microfluidic chamber.

11. The device of claim 1, wherein at least one of the first and second microfluidic layers are chemically functionalized with an antibody.

12. The device of claim 1, wherein the first microfluidic layer is chemically functionalized with a first antibody and the second microfluidic layer is chemically functionalized with a second antibody, the second antibody being different from the first antibody.

13. The device of claim 1, further comprising a housing surrounding the microfluidic chamber, the housing comprising a chemically functionalized hydrogel matrix.

14. The device of claim 13 further comprising:
    a pump connected to the housing; and
    a filter.

15. The device of claim 14, wherein the filter is chemically functionalized.

16. The device of claim 13, wherein the chemically functionalized hydrogel is a chemically functionalized cryogel.

17. The device of claim 1, wherein the first microfluidic layer is positioned on a first plane and the second microfluidic layer is positioned on a second plane, the second plane being different from the first plane.

18. The device of claim 17, wherein the first plane is parallel to the second plane.

19. The device of claim 2, wherein at least a portion of the microscale structures of the first array of microscale structures are positioned in an aligned arrangement such that at least a portion of the microscale structures of the first array of microscale structures are not shifted from alignment of at least a portion of adjacent microscale structures of the first array of microscale structures.

20. The device of claim 2, wherein at least a portion of the microscale structures of the first array of microscale structures are positioned in an offset arrangement such that at least a portion of the microscale structures of the first array of microscale structures are shifted a distance from approximately 50 μm to approximately 200 μm from in alignment of at least one adjacent microscale structure of the first array of microscale structures.

21. The device of claim 2, wherein at least a portion of the microscale structures of the first array of microscale structures have a cross-section in the general shape selected from the group consisting of a circle, oval, triangle, square, rectangle and rhombus.

22. The device of claim 14, wherein the filter is in fluidic communication with the microfluidic chamber.

23. The device of claim 14, wherein the filter is positioned downstream of the microfluidic chamber.

24. A method comprising:
    constructing, using an additive manufacturing device, the device of claim 1;
    removing, by a thermal release process, at least some sacrificial support material deposited by the additive manufacturing device;

chemically functionalizing at least a portion of the microfluidic chamber;
flushing the microfluidic chamber with uncured polydimethylsiloxane (PDMS); and
applying an airflow to the microfluidic chamber.

* * * * *